Feb. 11, 1958 R. H. WARD, JR 2,823,147
METHOD OF PRODUCING ELECTRICAL CONDUCTING ELEMENTS
Filed Dec. 7, 1953
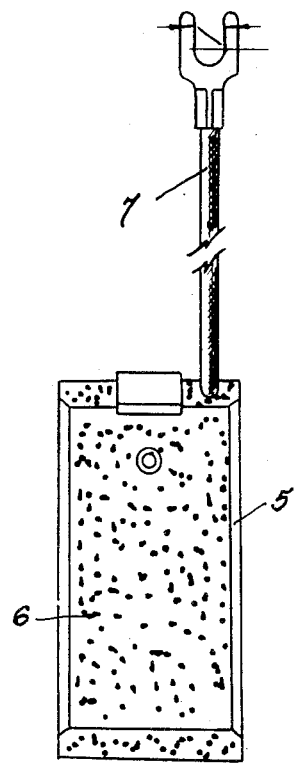
INVENTOR
Richard H. Ward, Jr.
Ralph Burch
Attorney

United States Patent Office 2,823,147
Patented Feb. 11, 1958

2,823,147

METHOD OF PRODUCING ELECTRICAL CONDUCTING ELEMENTS

Richard H. Ward, Jr., Copiague, N. Y.

Application December 7, 1953, Serial No. 396,731

2 Claims. (Cl. 117—228)

The present invention relates to improvements in antifriction or friction reducing elements or devices and compositions thereof, and methods of producing the same. More particularly the invention relates to means for reducing friction between mechanical elements having sliding contact with each other as in the case of electrical brushes on commutator bars or slip rings, and in bearings made of carbon, metal, or mixtures of carbon with metal, and other material.

It is known that under certain atmospheric conditions and with high sliding velocities, solids, such as carbon or graphite, tend to lose their lubricity, and that the lubricating properties of graphite, for instance, appear to be attributed to the moisture adsorbed by graphite particles. When an adsorbed film of water is not continuously present on the solid lubricating means during use, graphitic carbon particles become abrasive. This causes generation of heat locally sufficient to result in desorption of adsorbed water which in turn results in reduction of the lubrication obtained by use of such carbon particles.

It has been observed in the past that in aircraft equipped with electrical motors, generators, and other electrical devices requiring contact brushes, or mechanical means requiring solid lubricating bearings, when operating at high altitudes, for example, 30,000 feet above sea level or higher, particularly at low temperatures or with low relative humidity and reduced pressure, the life of graphite or carbon brushes or bearings is considerably shortened. The safety of airplanes has been jeopardized by the shortening of the life of graphite and carbon brushes.

In the drawing, an electrical conductor brush made in accordance with my invention is illustrated wherein the numeral 5 represents a carbon body impregnated with molybdenum disulphide particles 6 and provided with the usual conductor wire 7.

In the present invention, improved brush and bearing materials are provided by incorporating therewith molybdenum disulfide ($MoS_2$). This compound has a unique molecular structure which appears to be the basis of its lubricity. It is believed that the compound is composed of alternate layers of molybdenum atoms and of sulphur atoms. The sulphur atoms adhere to the metal surfaces forming a strong atomic bond with resulting film. The compound has exceptional stability and inertness, has a low solubility in boiling water or solvents, is highly acid-resistant, and is a conductor of electricity. It serves to maintain lubricity of brushes and bearings under all conditions of use and particularly under atmospheric conditions referred to above.

In preparing a brush or bearing, molybdenum disulphide powder is mixed with powdered amorphous carbon, mixtures of metal and amorphous carbon, graphite, metal graphite, or metal, and the mixture is molded into a brush or bearing. Porous stock can also be impregnated with a suspension of the finely divided molybdenum sulphide.

The molybdenum disulphide may be either in its mineral form comprising molybdenite, or a synthetic preparation of the compound.

Metal graphite, referred to hereinabove and as known in industry, is a combination of one or more metals, such as copper, silver, or alloys, in varying proportions, graphite (either mineral or artificial), and a binder. These substances are preferably mixed together in powdered form. The mixture is pressed into a cake or plate and baked at temperatures varying from about 500° F. to about 1500° F. The baked product is cut and machined into electrical brushes for motors and generators. The mix can also be extruded. The extrusion may be in the form of a tube, for instance, and may be cut and machined to size for bushing or other bearings.

For purposes of illustration of the invention, the following examples are presented:

*Example 1.*—Finely powdered molybdenum disulphide is mixed with powdered carbon, powdered graphite, powdered metal graphite, or a powdered metal or alloy, or other suitable powdered stock, including stock previously mentioned. By mechanical pressure the mixture is molded into a desired form for use and is baked or sintered. The molded form can be machined or sized. The proportion of the molybdenum disulphide is from about two percent (2%) to about twenty percent (20%) by weight of a molded form, such as a brush or bearing.

*Example 2.*—A preformed block, or form, of carbon, graphite, metal graphite, or porous or sintered metal, is submerged in an aqueous solution of ethyl alcohol containing a suspension of colloidal molybdenum disulphide in a closed vessel under subatmospheric pressure. The pressure in the vessel is thereafter raised to about 50 to 5000 pounds per square inch, thereby forcing the dispersion into pores of the solid block or form so that at least a part of the form is impregnated. The pressure is released, the liquid suspension medium is evaporated, and solid particles of molybdenum disulphide remain in the pores. Impregnated amounts of molybdenum disulphide vary from about one percent (1%) to about twelve percent (12%) by weight, generally depending on the porosity of the material treated. For use at high altitudes, satisfactory results are obtained with about two percent (2%) by weight of molybdenum disulphide. The most efficient film for decreasing the rate of wear of a brush or bearing has been found to be obtained with molybdenum disulphide in an amount of about five-tenths percent (0.5%) to about two percent (2%) by weight of a brush or bearing.

What is claimed is:

1. A method of making electrical conducting elements comprising forming a porous block of carbonaceous material, submerging the block in an aqueous solution of ethyl alcohol containing a suspension of colloidal molybdenum disulphide in a closed vessel under subatmospheric pressure, increasing the pressure in the vessel to force the dispersion into the pores of the block, releasing the pressure and then evaporating the suspension medium.

2. A method of making electrical conducting elements comprising forming a porous block of carbonaceous material, submerging the block in an aqueous solution containing a suspension of colloidal molybdenum disulphide in a closed vessel under subatmospheric pressure, increasing the pressure in the vessel to force the dispersion into the pores of the block, releasing the pressure and then evaporating the suspension medium.

(References on following page)

References Cited in the file of this patent

UNITED STATES PATENTS

| | | |
|---|---|---|
| 1,714,564 | Koehler | May 28, 1929 |
| 2,731,371 | Ramadanoff | Jan. 17, 1936 |
| 2,099,132 | Miller | Nov. 16, 1937 |
| 2,280,886 | Brace | Apr. 28, 1942 |
| 2,361,211 | Kalischer | Oct. 24, 1944 |
| 2,414,543 | Moberly | Jan. 21, 1947 |
| 2,420,886 | Laffoon | May 20, 1947 |
| 2,622,993 | McCullough et al. | Dec. 23, 1952 |